(12) United States Patent
Itsumi et al.

(10) Patent No.: US 11,809,297 B2
(45) Date of Patent: Nov. 7, 2023

(54) DATA ANALYSIS DEVICE, PRECISION ESTIMATION DEVICE, DATA ANALYSIS METHOD, AND STORAGE MEDIUM

(71) Applicant: NEC Corporation, Tokyo (JP)

(72) Inventors: Hayato Itsumi, Tokyo (JP); Masaharu Morimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 545 days.

(21) Appl. No.: 17/040,309

(22) PCT Filed: Apr. 19, 2019

(86) PCT No.: PCT/JP2019/016749
§ 371 (c)(1),
(2) Date: Sep. 22, 2020

(87) PCT Pub. No.: WO2019/208411
PCT Pub. Date: Oct. 31, 2019

(65) Prior Publication Data
US 2021/0019552 A1    Jan. 21, 2021

(30) Foreign Application Priority Data
Apr. 26, 2018   (JP) .................................. 2018-085787

(51) Int. Cl.
*G06F 11/34*   (2006.01)
*G06F 11/30*   (2006.01)
(Continued)

(52) U.S. Cl.
CPC ...... *G06F 11/3409* (2013.01); *G06F 11/3051* (2013.01); *G06F 11/324* (2013.01); *G06F 11/3428* (2013.01); *G06V 40/20* (2022.01)

(58) Field of Classification Search
CPC .. G06F 11/302; G06F 11/3051; G06F 11/324; G06F 11/3409; G06F 11/3419;
(Continued)

(56) References Cited

U.S. PATENT DOCUMENTS

2010/0318492 A1* 12/2010 Utsugi ................... G06F 16/20
707/603
2015/0074167 A1   3/2015 Sonoda et al.

FOREIGN PATENT DOCUMENTS

| JP | 2019-040417 A | 3/2019 |
| WO | 2013/146047 A1 | 10/2013 |
| WO | 2013/150786 A1 | 10/2013 |

OTHER PUBLICATIONS

Chaucer Chiu, TW201426594A, "System For Selecting Target Data Based On Attention Time And Method Thereof", Date Published: Jul. 1, 2014 (Year: 2014).*

(Continued)

*Primary Examiner* — John H Le
(74) *Attorney, Agent, or Firm* — Sughrue Mion, PLLC

(57) ABSTRACT

Provided is a data analysis device comprising: an analysis subject acquisition part for acquiring data to be analyzed (analysis subject data); a precision estimation part for estimating the analysis precision of the analysis subject data; a selection part for selecting an analysis module to be used in analyzing the analysis subject data on the basis of the result of estimating the analysis precision of the analysis subject data and information indicating the analysis time of the analysis subject data; and an analysis execution part for analyzing the analysis subject data using the analysis module having been selected by the selection part. According to this configuration, in cases where a data analysis device configures a data analysis processing method, the operator of the data analysis device does not have to preset a (Continued)

determination standard for configuring the processing method.

9 Claims, 12 Drawing Sheets

(51) Int. Cl.
 *G06F 11/32* (2006.01)
 *G06V 40/20* (2022.01)
(58) Field of Classification Search
 CPC .............. G06F 11/3428; G06F 9/445; G06F 2201/865; G06V 40/20
 USPC ..................................................... 702/182
 See application file for complete search history.

(56) References Cited

OTHER PUBLICATIONS

International Search Report for PCT Application No. PCT/JP2019/016749, dated Jul. 16, 2019.
English translation of Written opinion for PCT Application No. PCT/JP2019/016749, dated Jul. 16, 2019.

* cited by examiner

DATA ANALYSIS DEVICE, PRECISION ESTIMATION DEVICE, DATA ANALYSIS METHOD, AND STORAGE MEDIUM

This application is a National Stage Entry of PCT/JP2019/016749 filed on Apr. 19, 2019, which claims priority from Japanese Patent Application 2018-085787 filed on Apr. 26, 2018, the contents of all of which are incorporated herein by reference, in their entirety.

TECHNICAL FIELD

The present invention relates to a data analysis device, a precision estimation device, a data analysis method, and a storage medium.

BACKGROUND ART

When a data analysis device performs a data analysis, a processing method for the data analysis may be set for a purpose of adjusting a processing time and the like, for example (for example, see PTL 1). In a technique described in PTL 1, a plurality of determination references in which a content of input data is associated with load change processing of changing a load on an analysis engine such as a frame rate reduction or image filter invalidation are preset. Then, PTL 1 describes that a processing method for the data analysis is set by performing the load change processing specified according to a determination result of the content of the input data being an analysis target.

CITATION LIST

Patent Literature

[PTL 1] International Publication No. WO2013/150786

SUMMARY OF INVENTION

Technical Problem

In a case where a data analysis device sets a processing method for a data analysis, when a setting operator of the data analysis device does not need to preset a determination reference for setting the processing method, a load on the setting operator can be further reduced.

An object of the present invention is to provide a data analysis device and the like capable of solving the problem described above.

Solution to Problem

According to a first aspect of the present invention, a data analysis device includes an analysis target acquisition unit that acquires analysis target data, a precision estimation unit that estimates analysis precision of the analysis target data in each of a plurality of analysis modules, based on analysis precision of comparison target data similar to the analysis target data beyond a reference among a plurality of pieces of comparison target data having known analysis precision in each of the plurality of analysis modules, a selection unit that selects an analysis module to be used for an analysis of the analysis target data from among the plurality of analysis modules, based on an estimation result of analysis precision of the analysis target data in each of the plurality of analysis modules and information indicating an analysis time of the analysis target data in each of the plurality of analysis modules, and an analysis execution unit that performs an analysis of the analysis target data by using an analysis module selected by the selection unit.

According to a second aspect of the present invention, a precision estimation device includes an analysis target acquisition unit that acquires analysis target data, and a precision estimation unit that estimates analysis precision of the analysis target data in each of a plurality of analysis modules, based on analysis precision of comparison target data similar to the analysis target data beyond a reference among a plurality of pieces of comparison target data having known analysis precision in each of the plurality of analysis modules.

According to a third aspect of the present invention, a data analysis method includes acquiring analysis target data, estimating analysis precision of the analysis target data in each of a plurality of analysis modules, based on analysis precision of comparison target data similar to the analysis target data beyond a reference among a plurality of pieces of comparison target data having known analysis precision in each of the plurality of analysis modules, selecting an analysis module to be used for an analysis of the analysis target data from among the plurality of analysis modules, based on an estimation result of analysis precision of the analysis target data in each of the plurality of analysis modules and information indicating an analysis time of the analysis target data in each of the plurality of analysis modules, and performing an analysis of the analysis target data by using a selected analysis module.

According to a fourth aspect of the present invention, a program causes a computer to execute processing of acquiring analysis target data, processing of estimating analysis precision of the analysis target data in each of a plurality of analysis modules, based on analysis precision of comparison target data similar to the analysis target data beyond a reference among a plurality of pieces of comparison target data having known analysis precision in each of the plurality of analysis modules, processing of selecting an analysis module to be used for an analysis of the analysis target data from among the plurality of analysis modules, based on an estimation result of analysis precision of the analysis target data in each of the plurality of analysis modules and information indicating an analysis time of the analysis target data in each of the plurality of analysis modules, and processing of performing an analysis of the analysis target data by using a selected analysis module.

Advantageous Effects of Invention

According to the present invention, when a data analysis device sets a processing method for a data analysis, a setting operator of the data analysis device does not need to preset a determination reference for setting the processing method.

EXAMPLE EMBODIMENT

Example embodiments of the present invention will be described below, and the following example embodiments do not limit the invention according to claims. Further, all combinations of characteristics described in the example embodiments are not necessarily essential to a means for solving the invention.

First Example Embodiment

Figure 1:
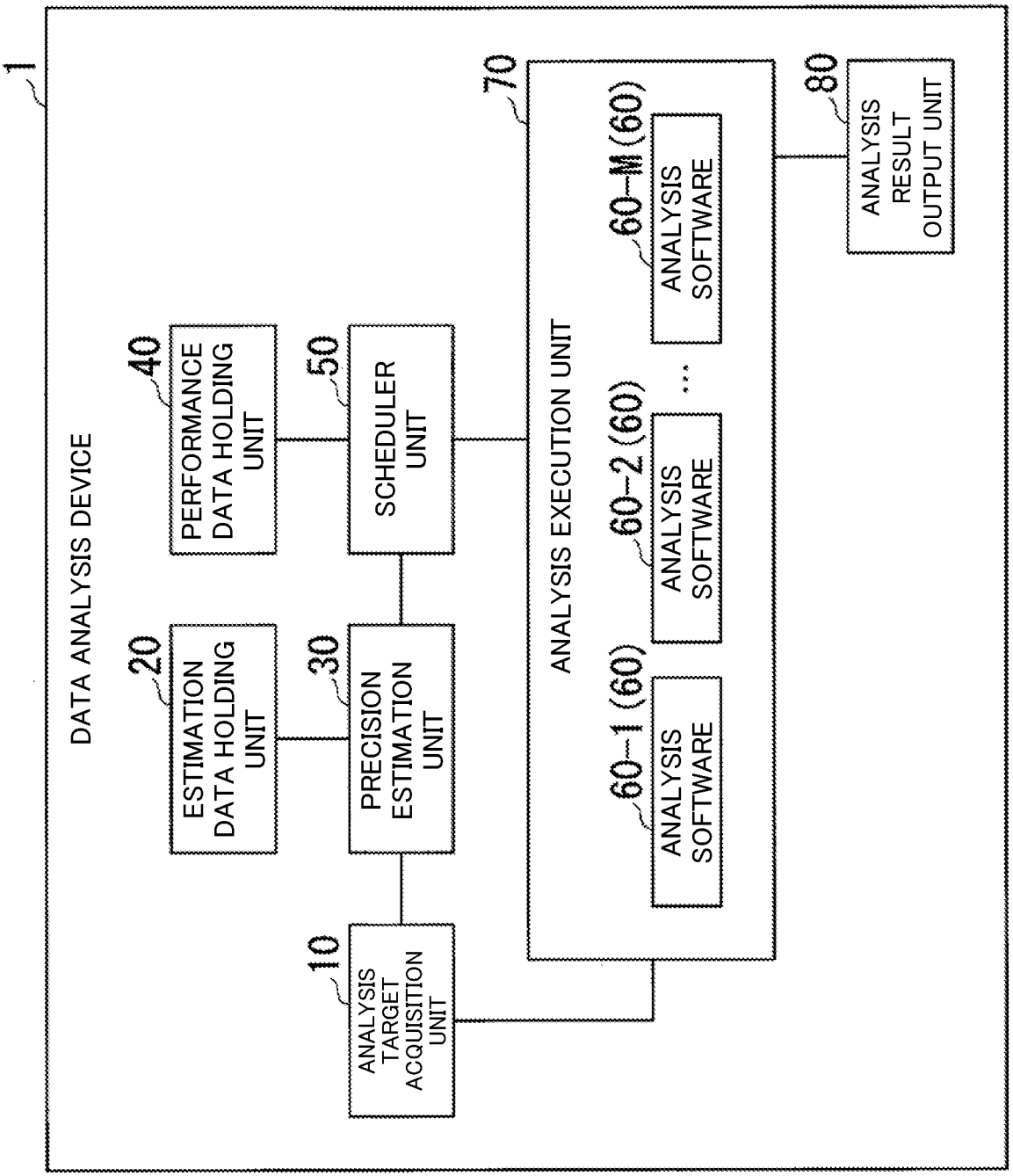
FIG. 1 is a schematic block diagram illustrating a functional configuration example of a data analysis device according to a first example embodiment.

FIG. 1 is a schematic block diagram illustrating a functional configuration example of a data analysis device according to a first example embodiment. In a configuration illustrated in FIG. 1, a data analysis device 1 includes an analysis target acquisition unit 10, an estimation data holding unit 20, a precision estimation unit 30, a performance data holding unit 40, a scheduler unit 50, an analysis execution unit 70, and an analysis result output unit 80. The analysis execution unit 70 includes M (M is a positive integer) pieces of analysis software 60-1 to 60-M. The pieces of the analysis software 60-1 to 60-M are collectively expressed as analysis software 60. Note that the analysis software may also be referred to as processing software.

The data analysis device 1 performs an analysis of data. Hereinafter, description is given by taking, as an example, a case where the data analysis device 1 receives an input of image data, and performs an analysis of an image. Specifically, the data analysis device 1 receives an input of moving image data, and performs processing of detecting an image of a person for each frame of a moving image. The data analysis device 1 may perform an image analysis on all frames of a moving image, or may perform an analysis on a part of frames in such a way as to perform an image analysis for each frame at a fixed interval and the like.

Alternatively, the data analysis device 1 may acquire still image data photographed for each fixed period of time, and detect an image of a person from a still image.

For example, the data analysis device 1 may be used for crime prevention in a facility such as a retail store, a stadium, or a shopping mall, marketing, an operation improvement, or the like. For example, the data analysis device 1 may be installed at a retail store, detect an image of a visitor from a moving image photographed by a camera installed inside the store, and furthermore estimate an age, a gender, and a flow in the store of the visitor.

An individual piece of data being a processing target of the data analysis device 1 is referred to as processing target data. Further, an image indicated by the processing target data is referred to as a processing target image. Further, an image indicated by image data is also referred to as an image of image data. When the data analysis device 1 receives an input of moving image data, and performs an analysis for each frame, data of each frame correspond to an example of the processing target data, and an image of each frame corresponds to an example of the processing target image.

However, data being a processing target of the data analysis device 1 are not limited to image data. Various types of data can be a processing target of the data analysis device 1. Further, an analysis performed by the data analysis device 1 is not limited to detection of an image of a person. Furthermore, an analysis performed by the data analysis device 1 is not limited to an image analysis. An analysis method can be selected for an analysis performed by the data analysis device 1. An analysis performed by the data analysis device 1 can be an analysis having a trade-off relationship between analysis precision and an analysis time. The trade-off herein refers to an increase in analysis time when analysis precision is increased, and a decrease in analysis precision when an analysis time is reduced.

The data analysis device 1 is configured by using a computer such as a personal computer (PC) or a workstation, for example. The data analysis device 1 may be configured as one device, and may be configured as a plurality of devices. For example, the data analysis device 1 may be configured in a combination of a database machine that functions as the estimation data holding unit 20 and a body of a data analysis device that performs a function other than the estimation data holding unit 20. Alternatively, among the units of the data analysis device 1, the analysis target acquisition unit 10, the estimation data holding unit 20, and the precision estimation unit 30, or the analysis target acquisition unit 10 and the precision estimation unit 30 may be configured as a precision estimation device.

The analysis target acquisition unit 10 acquires analysis target data. Hereinafter, description is given by taking, as an example, a case where the analysis target acquisition unit 10 acquires image data as analysis target data. For example, the analysis target acquisition unit 10 is configured as a communication unit that performs communication with another device, and receives moving image data output (transmitted) by performing photographing by a camera.

Each piece of the analysis software 60 corresponds to an example of an analysis module. An analysis of analysis target data is performed by execution of the analysis software 60. Particularly, an image analysis such as the detection of an image of a person described above, for example, is performed by execution of each piece of the analysis software 60. The module herein is one substance constituted of dedicated hardware that performs a predetermined operation, a unit formed of software and hardware that executes the software, or the like. The analysis software 60 may be configured as a part of the analysis execution unit 70, and may be configured as a configuration different from the analysis execution unit 70. The analysis execution unit 70 may be in an aspect capable of executing each piece of the analysis software 60.

The analysis execution unit 70 includes the plurality of pieces of the analysis software 60 varying in processing speed and analysis precision. The analysis execution unit 70 performs an analysis of an analysis target image by using the analysis software 60 selected (assigned by scheduling) for each piece of analysis target data by the scheduler unit 50. The number of pieces of the analysis software 60 included in the analysis execution unit 70 may be equal to or more than two. Hereinafter, description is given by taking, as an example, a case where the analysis execution unit 70 includes three pieces of the analysis software 60 that are pieces of analysis software A to C.

However, an analysis module included in the analysis execution unit 70 is not limited to each analysis module configured as software. For example, the analysis execution unit 70 may include an analysis module in a hardware form such as an analysis module in a board form or an analysis module in a chip form. Alternatively, the analysis execution unit 70 may include image analysis software that can change a processing speed and analysis precision by parameter setting. In this case, image analysis software for each parameter setting pattern corresponds to an example of the analysis module. When the analysis target acquisition unit 10 acquires a moving image, an image analysis performed by the analysis execution unit 70 is also referred to as a video analysis.

Figure 2:
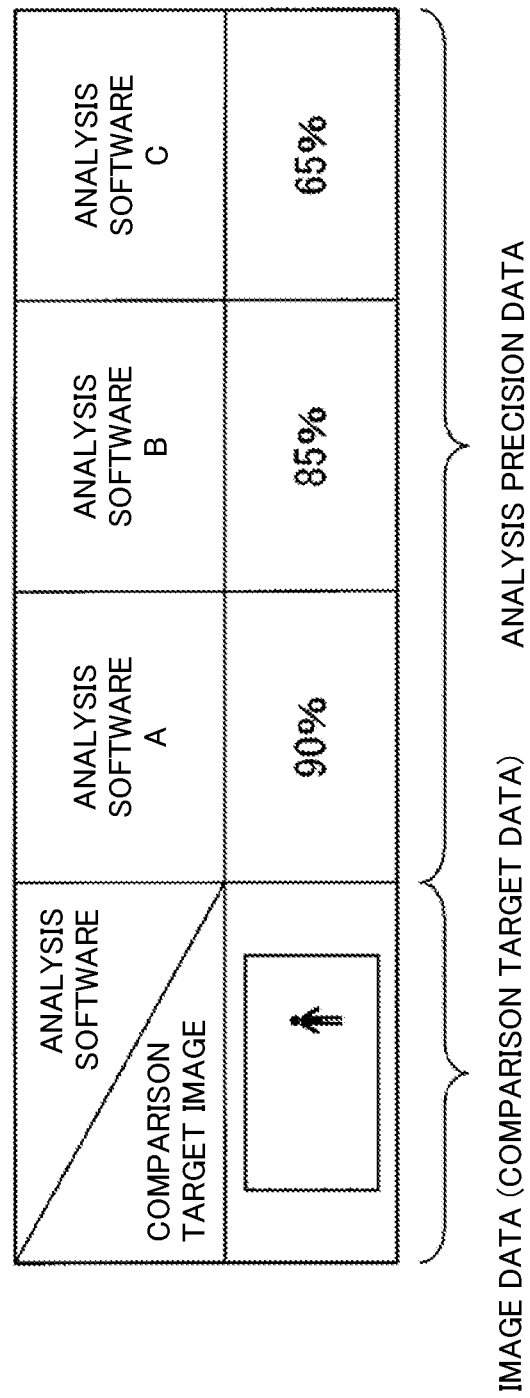
FIG. 2 is a diagram illustrating an example of estimation data held by an estimation data holding unit according to the first example embodiment.

The estimation data holding unit 20 holds (stores) estimation data used for an estimation of analysis precision by the precision estimation unit 30. FIG. 2 is a diagram illustrating an example of estimation data held by the estimation data holding unit 20. As in the example in FIG. 2, the estimation data are constituted of image data and analysis precision data of the image data in association with each other.

The image data included in the estimation data are used for a determination of a degree of similarity of an image to analysis target data. Specifically, the precision estimation unit 30 compares an image of the image data included in the estimation data with an analysis target image, and calculates a degree of similarity. The image data included in the estimation data are referred to as comparison target data (comparison target data set, comparison target data record), and an image indicated by the comparison target data is referred to as a comparison target image. The estimation data holding unit 20 previously holds estimation data of each of a plurality of pieces of comparison target data before the data analysis device 1 performs an analysis of analysis target data.

Analysis precision data indicate, for each piece of the analysis software 60, analysis precision when an image of associated image data is analyzed by the analysis software 60. In the example in FIG. 2, the analysis precision data indicate analysis precision of a comparison target image by each of the three pieces of the analysis software 60 that are the pieces of the analysis software A to C included in the analysis execution unit 70. For each of the plurality of pieces of the analysis software 60, analysis precision when the analysis software 60 analyzes a comparison target image is known. For example, the precision estimation unit 30 performs an analysis of a comparison target image by using the analysis software 60 for each piece of the comparison target data and each piece of the analysis software 60, calculates precision (analysis precision) of an analysis result, and associates the precision with the comparison target image, and may thus automatically generate estimation data.

The precision estimation unit 30 estimates analysis precision of analysis target data in each piece of the analysis software 60. The precision estimation unit 30 performs an estimation of analysis precision, based on analysis precision to the same degree being acquired when a similar image is applied to the same analysis software 60. Specifically, the precision estimation unit 30 searches the estimation data holding unit 20 for a comparison target image similar to an analysis target image. Then, the precision estimation unit 30 estimates analysis precision of the analysis target image from analysis precision of the similar image (the comparison target image similar to the analysis target image) acquired through searching.

More specifically, the precision estimation unit 30 compares an analysis target image with each of comparison target images, and calculates a degree of similarity to the analysis target image for each of the comparison target images. Then, the precision estimation unit 30 reads, from the estimation data holding unit 20, analysis precision data associated with the comparison target image similar to the analysis target image beyond a reference. The reference herein is a reference (selection reference of a similar image) of similarity between the analysis target data and the comparison target data. The reference is preset as a constant indicating a threshold value of a degree of similarity, for example. Being similar beyond the reference herein refers to a degree of similarity between the two images (the analysis target image and the comparison target image) satisfying the reference. The precision estimation unit 30 calculates analysis precision of the analysis target data for each piece of the analysis software 60, based on analysis precision for each of the comparison target images indicated by the acquired analysis target data and for each piece of the analysis software 60.

Figure 3:
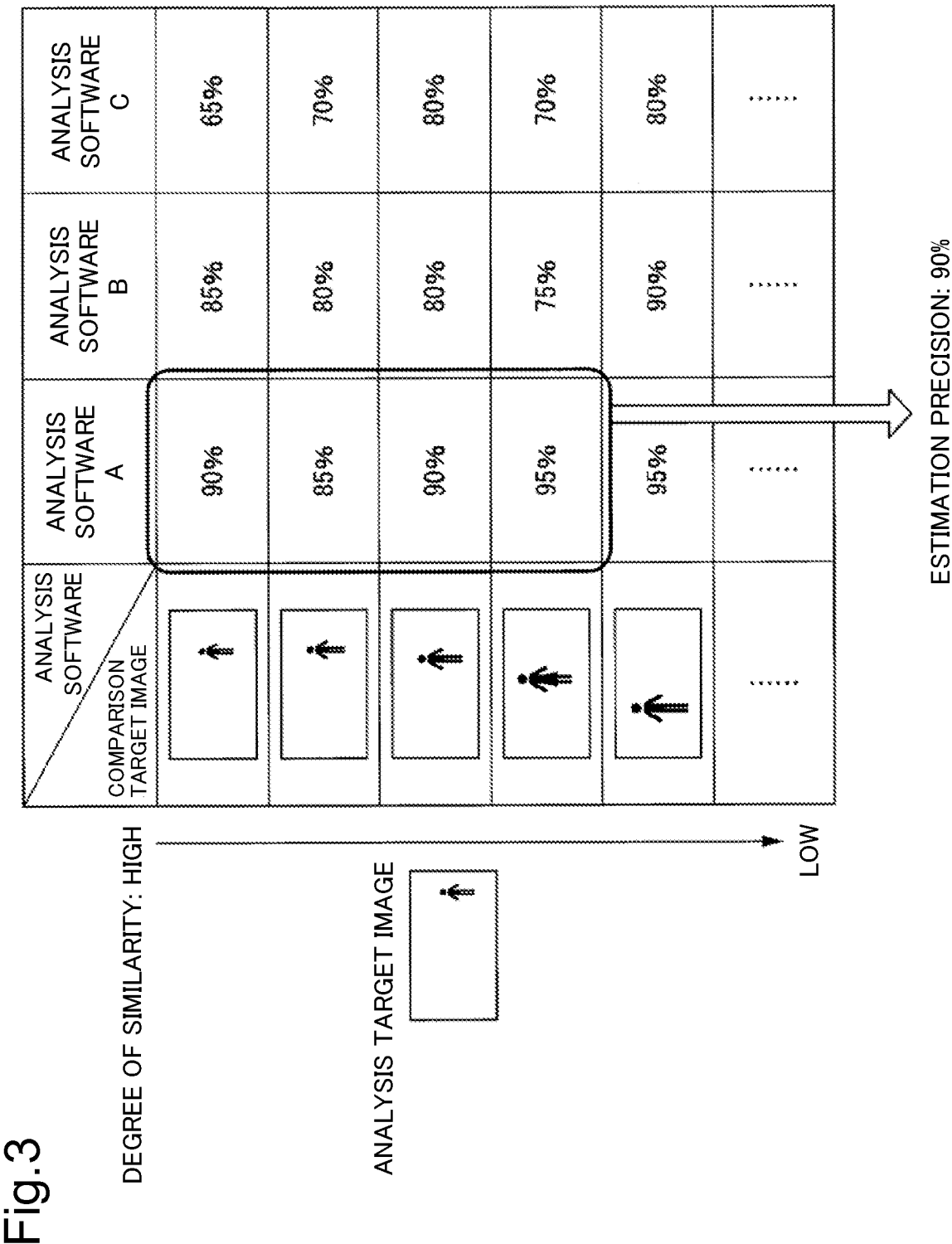
FIG. 3 is a diagram illustrating an example of precision estimation performed by a precision estimation unit according to the first example embodiment.

FIG. 3 is a diagram illustrating an example of a precision estimation (calculation of an analysis precision estimation value) performed by the precision estimation unit 30. In the example in FIG. 3, the precision estimation unit 30 calculates a degree of similarity to an analysis target image for each comparison target image, and sorts estimation data in decreasing order of degree of similarity. In other words, a plurality of comparison target images are arranged in decreasing order of degree of similarity in a leftmost column in FIG. 3. Then, in FIG. 3, an analysis precision estimation value of the comparison target image by the pieces of the analysis software A to C is indicated for each of the comparison target images. Specifically, processing is performed by a following procedure. First, the precision estimation unit 30 compares the analysis target image with the comparison target image, and sorts the comparison target images in decreasing order of degree of similarity. As illustrated in FIG. 3, an analysis precision estimation value of the comparison target image by the pieces of the analysis software A to C is different for each piece of the analysis software. Next, the precision estimation unit 30 selects top four pieces of estimation data in decreasing order of degree of similarity to the comparison target image. Then, the precision estimation unit 30 calculates, as an estimation value of analysis precision of the analysis target image, an average value of analysis precision estimation values of the comparison target images by the analysis software A indicated by the selected estimation data. In this case, a reference that is four pieces of estimation data in descending order of degree of similarity corresponds to an example of a reference of similarity between analysis target data and comparison target data. In the example in FIG. 4, the precision estimation unit 30 estimates that analysis precision of the analysis target image by the analysis software 60A is 90% by using the four pieces of the selected estimation data in the order in which an image is similar to the analysis target image. Note that, herein, as described above, the precision estimation unit 30 selects the top four pieces of the estimation data in the decreasing order of degree of similarity to the comparison target image. However, a selection target of the precision estimation unit 30 is not limited to the top four pieces of the estimation data in the decreasing order of degree of similarity to the comparison target image. The selection target of the precision estimation unit 30 may be top two pieces or top four or more pieces of the estimation data in the decreasing order of degree of similarity to the comparison target image.

However, a reference used by the precision estimation unit 30 is not limited to this, and various references can be adopted as a reference used by the precision estimation unit 30. For example, the precision estimation unit 30 may select estimation data having a degree of similarity to a comparison target image equal to or higher than a predetermined threshold value. In this case, a reference that is the degree of similarity equal to or higher than the predetermined threshold value corresponds to an example of a reference of similarity between the analysis target data and comparison target data. Various known methods can be used for a method of determining a degree of similarity of an image by the precision estimation unit 30. In other words, a degree of similarity of various known items can be used for a degree of similarity used for selecting estimation data by the precision estimation unit 30.

For example, the precision estimation unit 30 may calculate a degree of similarity of a color histogram between images of analysis target data and comparison target data. Specifically, the precision estimation unit 30 may set a color in an image to be in a histogram for each piece of analysis target data and comparison target data, and calculate, as a degree of similarity, a distance calculated from the color histogram between the images.

Alternatively, the precision estimation unit 30 may select estimation data, based on a degree of similarity between pixel values of analysis target data and comparison target data. For example, the precision estimation unit 30 may calculate a mean squared error of a pixel value of comparison target data with a reference to a pixel value of analysis target data. The mean squared error in this case represents how much pixel values in the same position are different between two images. As a calculated value of the mean squared error is smaller, a degree of similarity between the analysis target image and the comparison target image is higher.

Figure 4:
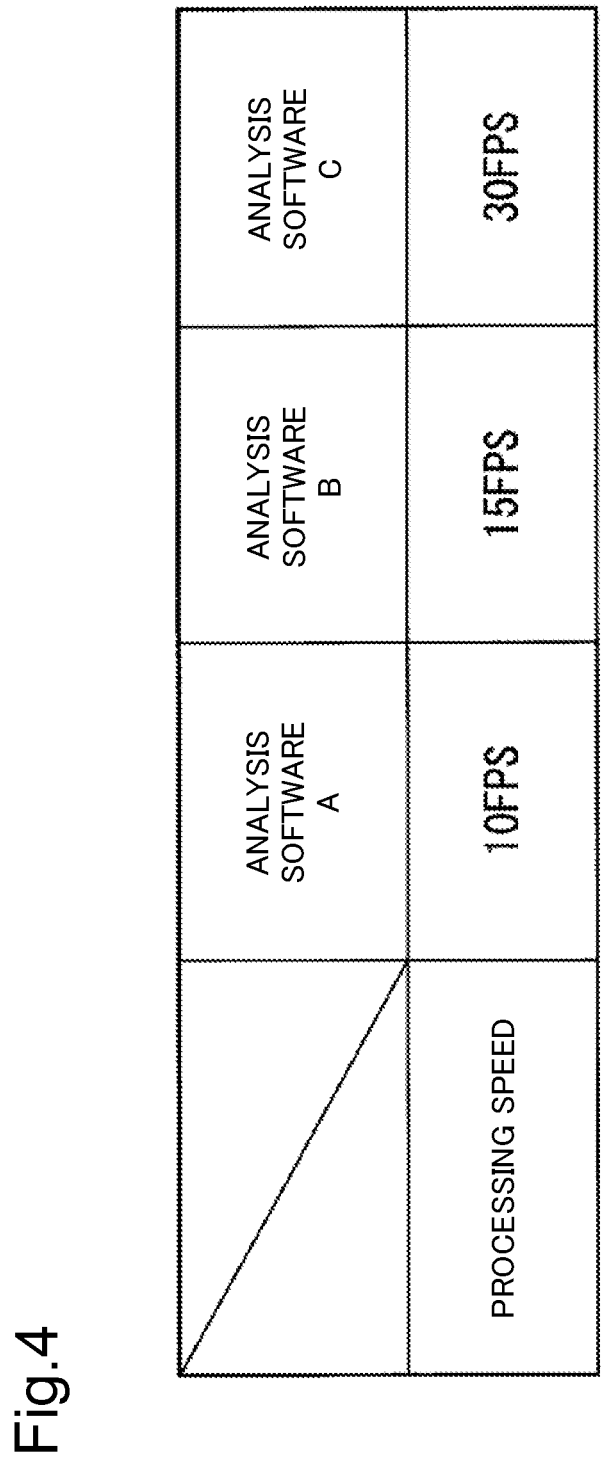
FIG. 4 is a diagram illustrating an example of speed data held by a performance data holding unit according to the first example embodiment.

The performance data holding unit 40 holds (stores) data indicating performance of each piece of the analysis software 60. Particularly, the performance data holding unit 40 holds speed data indicating a processing speed of each piece of the analysis software 60. FIG. 4 is a diagram illustrating an example of speed data held by the performance data holding unit 40. In FIG. 4, the speed data indicate a processing speed of each of the three pieces of the analysis software 60 that are the pieces of the analysis software A to C included in the analysis execution unit 70. The processing speed indicated by the performance data holding unit 40 is common to each piece of image data. In other words, an individual piece of the analysis software 60 analyzes various images at the same processing speed.

The speed data held by the performance data holding unit 40 are also data indicating a length of a processing time by each piece of the analysis software 60. For example, in FIG. 4, a frames per second (FPS, the number of images processed per second) is used as a unit of a processing speed of the analysis software 60. In this case, a time required to process one frame by the analysis software 60 is indicated by a reciprocal of a processing speed. For example, a time required to process one frame by the analysis software A is 0.1 second (1/10 second). "/" represents division.

The scheduler unit 50 performs scheduling on a function of the data analysis device 1. For example, the scheduler unit 50 is constituted by using an operating system (OS) included in the data analysis device 1, and performs scheduling on execution of software that achieves a function of the data analysis device 1. Particularly, the scheduler unit 50 selects the analysis software 60 to be used for an analysis of analysis target data, based on an estimation result of analysis precision of the analysis target data in each of the plurality of pieces of the analysis software 60 and information indicating an analysis time of the analysis target data in each of the plurality of pieces of the analysis software 60. When there are a plurality of analysis target images such as when each of a plurality of frames of a moving image is an analysis target, the scheduler unit 50 assigns which analysis target image is processed by which analysis software 60. The speed data held by the performance data holding unit 40 indicate a processing speed of each piece of the analysis software 60 to be input to the scheduler unit 50.

The scheduler unit 50 determines whether to accept a combination of analysis target data and the analysis software 60 in order in which analysis precision is high and a processing time is short, and selects one piece of the analysis software 60 at most for one piece of the analysis target data. In this way, the scheduler unit 50 can cause the analysis execution unit 70 to perform more analyses with high precision by preferentially selecting processing having high analysis precision and a short processing time.

Further, the scheduler unit 50 selects the analysis software 60 estimated to have higher analysis precision within a range in which a predetermined condition related to a time required for an image analysis is satisfied. In this way, the scheduler unit 50 can cause the analysis execution unit 70 to perform an analysis that satisfies a limiting condition of time and has higher precision.

Further, when it is estimated that analysis precision equal to or more than the predetermined condition cannot be acquired by even any of the pieces of the analysis software 60 for analysis target data, the scheduler unit 50 determines that an analysis of the analysis target data is not performed. When analysis precision does not satisfy the predetermined condition, there is a possibility that an effective analysis result is not acquired and processing is useless. In contrast, the scheduler unit 50 determines that an analysis of analysis target data in which analysis precision equal to or more than the predetermined condition is not acquired is not performed, and thus execution of useless processing by the analysis execution unit 70 can be suppressed, and a resource can be effectively used.

Figure 5:
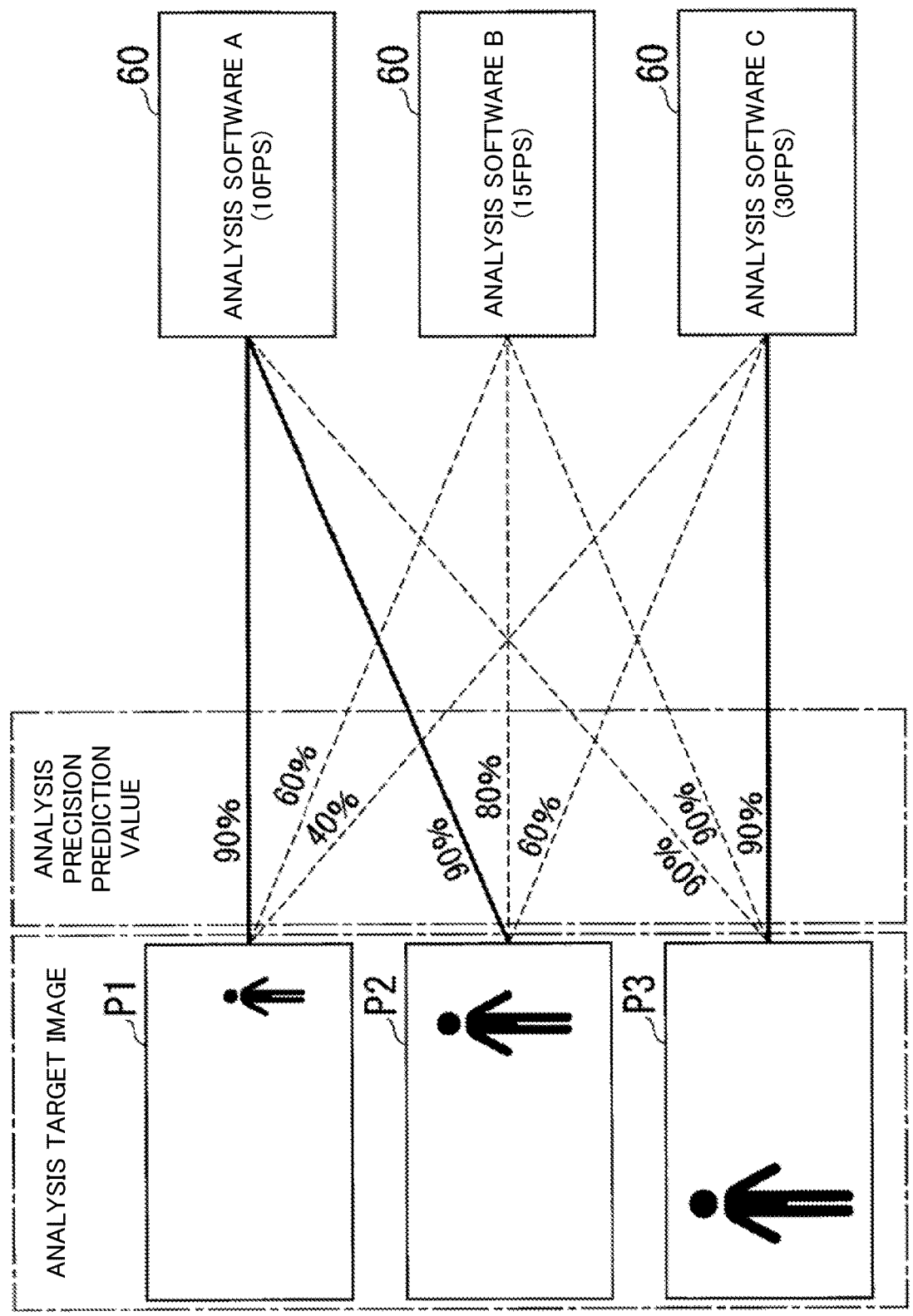
FIG. 5 is a diagram illustrating an example of scheduling of analysis software by a scheduler unit according to the first example embodiment.

FIG. 5 is a diagram illustrating an example of scheduling of the analysis software 60 by the scheduler unit 50. The data analysis device 1 properly uses the plurality of pieces of the analysis software 60 having different processing speeds and analysis precision according to an analysis target image for a purpose of maximizing analysis precision on a limited calculation resource. For proper use of the analysis software 60, the precision estimation unit 30 estimates analysis precision acquired by each piece of the analysis software 60 with respect to the analysis target image. Then, the scheduler unit 50 determines which analysis target image is applied to which analysis software 60 from the analysis precision estimated by the precision estimation unit 30 and a processing speed of the analysis software 60. The scheduler unit 50 performs scheduling in such a way that an analysis target image from which even the analysis software 60 at a fast processing speed acquires analysis precision is processed by the analysis software 60 at a fast processing speed. In this way, the scheduler unit 50 achieves maximization of analysis precision on a limited resource.

In the example in FIG. 5, among the pieces of the analysis software A, B, and C, a processing speed of the analysis software C is the fastest, a processing speed of the analysis software B is the second fastest, and a processing speed of the analysis software A is the slowest. There is a trade-off between a processing speed and analysis precision of the pieces of the analysis software, and the analysis precision also varies depending on an analysis target image. For analysis target images P1 and P2, an analysis precision prediction value when the analysis software A is used is the highest, an analysis precision prediction value when the analysis software B is used is the second highest, and an analysis precision prediction value when the analysis software C is used is the lowest. On the other hand, for the analysis target image P3, a similar analysis precision prediction value is acquired even when any of the pieces of the analysis software A, B, and C is used. Thus, the scheduler unit 50 assigns the analysis software A to an analysis of each of the analysis target images P1 and P2, and assigns the analysis software C to an analysis of the analysis target image P3. In this way, for example, as compared to a case where the analysis software A is used for an analysis of all of the analysis target images P1, P2, and P3, it is expected that a processing time can be shortened while similar analysis precision is maintained.

The analysis result output unit 80 outputs an analysis result by the analysis execution unit. Various methods can be used for a method of outputting an analysis result by the analysis result output unit 80. For example, the analysis result output unit may include a display device such as a liquid crystal display, and display an analysis result. Alternatively, the analysis result output unit 80 may be configured as a communication unit that performs communication with another device, and transmit data indicating an analysis result to the another device.

Figure 6:
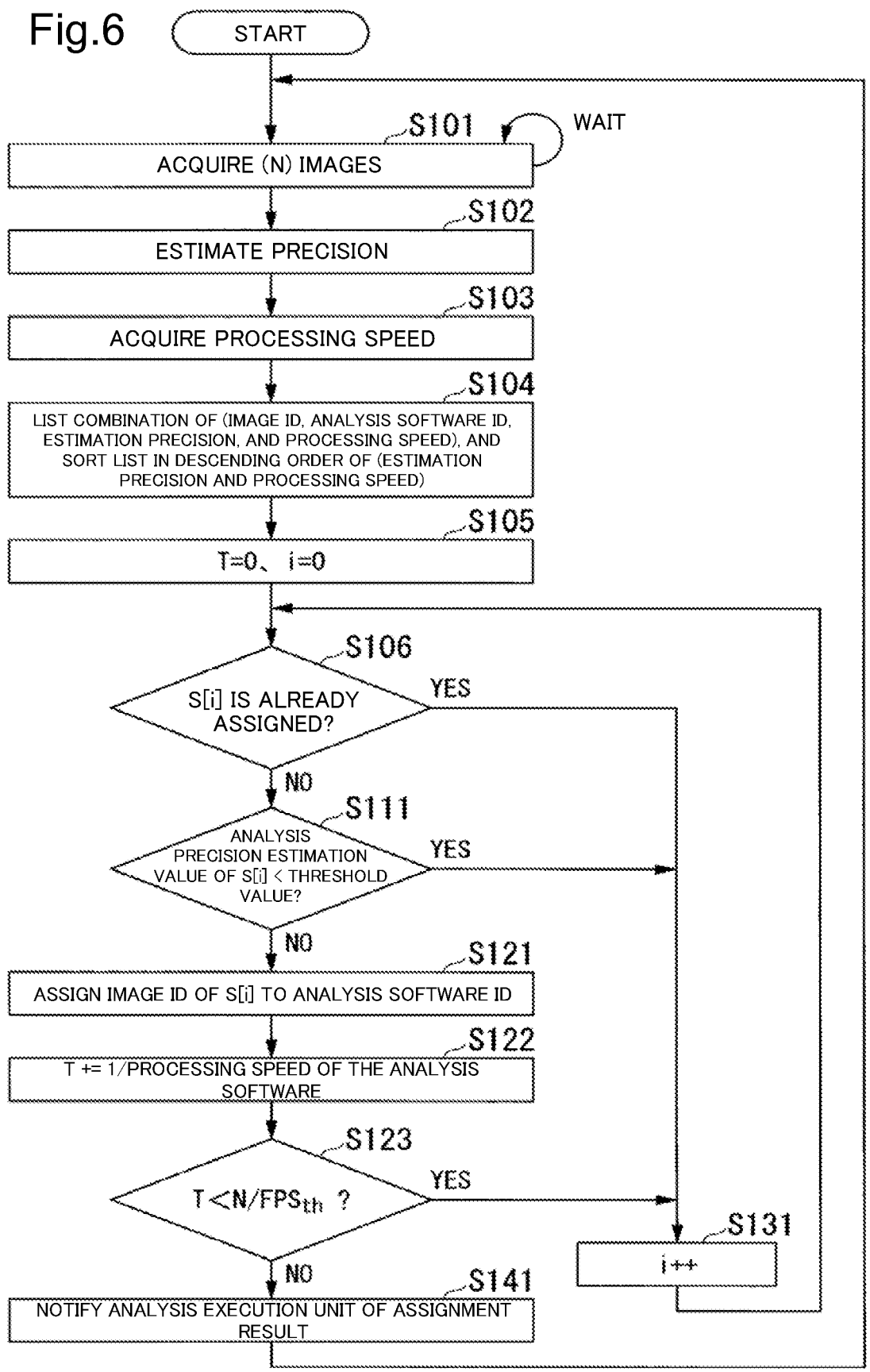
FIG. 6 is a diagram illustrating an example of a processing procedure of a data analysis device 1 when the scheduler unit according to the first example embodiment assigns an analysis target image to the analysis software.

Next, an operation of the data analysis device 1 will be described with reference to FIG. 6. FIG. 6 is a diagram illustrating an example of a processing procedure of the data analysis device 1 when the scheduler unit 50 assigns an analysis target image to the analysis software 60. In the processing in FIG. 6, the analysis target acquisition unit 10 waits for an analysis target image (step S101). The number of analysis target images acquired by the analysis target acquisition unit 10 at once may be one or more.

When the analysis target acquisition unit 10 acquires N (N is a positive integer) analysis target image, the precision estimation unit 30 estimates analysis precision for each analysis target image and each piece of the analysis software 60 (step S102). As described with reference to FIG. 3, the estimation data holding unit 20 holds comparison target data and analysis precision data indicating precision when a comparison target image of the comparison target data is analyzed by the analysis software 60 for each piece of the analysis software 60, in association with each other. The precision estimation unit 30 searches for an image similar to an analysis target image among comparison target images of the comparison target data held by the estimation data holding unit 20. Then, the precision estimation unit 30 estimates analysis precision of the analysis target image from analysis precision of the similar image acquired through searching. The precision estimation unit 30 outputs information indicating an estimation result of the analysis precision to the scheduler unit 50.

Further, the scheduler unit 50 acquires a processing speed of each piece of the analysis software 60 from the performance data holding unit 40 (step S103). Specifically, the scheduler unit 50 reads processing speed data described with reference to FIG. 4 from the performance data holding unit 40.

The scheduler unit 50 lists a combination of (image identifier (ID), analysis software ID, analysis precision estimation value, and processing speed) from the acquired information about the analysis precision and the processing speed, and sorts the list in descending order in which analysis precision is high and a processing speed is fast (step S104). The image ID is identification information that identifies an image. The image ID in the combination identifies an analysis target image. The analysis software ID is identification information that identifies the analysis software 60.

For example, the scheduler unit 50 calculates an evaluation value for each analysis target image and for each piece of the analysis software 60 by using an analysis precision estimation value and an evaluation function with a processing speed as an argument, and sorts evaluation values in decreasing order of evaluation value (namely, decreasing order of evaluation). Hereinafter, a sequence of sort results (list of the combination mentioned above) is indicated by S, and each element in the sequence S is indicated by S[i]. S[i] indicates the combination of (image ID, analysis software ID, analysis precision estimation value, and processing speed). i is an integer of i≥0, and an analysis precision estimation value is higher and a processing speed is faster (an evaluation value is greater) as a value of i is smaller.

In steps S105 to S131, the scheduler unit 50 assigns an analysis target image to the analysis software 60 with reference to the order from top of the sorted sequence (order in which analysis precision is high and a processing speed is fast). Specifically, the scheduler unit 50 resets each of values of variables T and i to 0 (step S105). The variable T is used for totaling a reciprocal of a processing speed. The reciprocal of the processing speed is an index value indicating a length of a processing time. The variable i is used as a counter variable for processing the element S[i] in the sequence S in the order in which analysis precision is high and a processing speed is fast.

Next, the scheduler unit 50 determines whether a processing target image is already assigned to any piece of the analysis software 60 for the element S[i] (step S106). When the scheduler unit 50 determines that the processing target image is already assigned, the scheduler unit 50 counts up the value of the variable i by one (step S131). After step S131, the processing returns to step S106.

On the other hand, when the scheduler unit 50 determines that the processing target image is not yet assigned to any piece of the analysis software 60 for the element S[i] in step S106 (step S106: NO), the scheduler unit 50 determines whether an analysis precision estimation value included in the element S[i] is smaller than a preset threshold value (step S111). When the scheduler unit 50 determines that the analysis precision estimation value is smaller than the threshold value (step S111: YES), the processing proceeds to step S131. When the analysis precision estimation value is lower than the preset threshold value, a good result will not be acquired by even performing an analysis, and thus a combination of an image indicated by the element S[i] and the analysis software 60 is excluded from a target for assignment (target for scheduling).

On the other hand, when the scheduler unit 50 determines that the analysis precision estimation value included in the element S[i] is equal to or more than the threshold value in step S111 (step S111: NO), the scheduler unit 50 assigns an image ID to analysis software ID by the combination indicated by the element S[i] (step S121). The scheduler unit 50 performs scheduling by the assignment in such a way that the analysis software 60 indicated by the analysis software ID analyzes the analysis target image indicated by the image ID. Next, the scheduler unit 50 updates the value of the variable T in computation indicated by Expression (1) (step S122).

[Expression 1]

$$T\mathrel{+}=1/\text{PROCESSING SPEED OF THE VIDEO ANALYSIS PROGRAM} \qquad (1)$$

The scheduler unit 50 adds "1/processing speed of the analysis software 60" to the value of the variable T in the computation indicated by Expression (1). Note that "processing speed of the video analysis program" in Expression (1) is synonymous with "processing speed of the processing software" and "processing speed of the analysis software". "The analysis software 60" herein is the analysis software 60 assigned in step S121. "1/processing speed of the analysis software 60" is an index value indicating a length of a time required to analyze an image by an image program. For example, the processing illustrated in FIG. 6 uses an FPS as a unit of a processing speed of the analysis software 60. As described with reference to FIG. 4, "1/processing speed of the analysis software 60" indicates a time required to analyze one image (one frame) by "the analysis software 60".

Next, the scheduler unit 50 determines whether the value of the variable T is smaller than a threshold value "$N/FPS_{th}$" (step S123). The threshold value "$N/FPS_{th}$" indicates an allowable value (upper limit value) of a time for analyzing an analysis target image by the analysis execution unit 70. The threshold value "$N/FPS_{th}$" is calculated by dividing the number N of analysis target images acquired by the analysis target acquisition unit 10 in step S101 by a time $FPS_{th}$ being preset as an allowable value of a processing time per one image.

When the scheduler unit 50 determines that the value of the variable T is smaller than the threshold value "$N/FPS_{th}$" (step S123: YES), the processing proceeds to step S131. In this case, the processing time by the analysis execution unit 70 has not yet reached the allowable upper limit value. Thus, the scheduler unit 50 repeats the processing from step S106, and further assigns an analysis target image to the analysis software 60. On the other hand, when the scheduler unit 50 determines that the value of the variable T is equal to or more than the threshold value "$N/FPS_{th}$" in step S123 (step S123: NO), the scheduler unit 50 notifies the analysis execution unit 70 of an assignment result (step S141). In this case, the processing time by the analysis execution unit 70 has reached the allowable upper limit value. Thus, the scheduler unit 50 terminates the assignment of the analysis target image to the analysis software 60, and notifies the analysis execution unit 70 of an assignment result.

In a case of the operation, the time $FPS_{th}$ is set in such a way that the processing time upper limit value indicated by the threshold value "$N/FPS_{th}$" has some margins. Alternatively, the operation may be set in such a way that a processing time of the analysis execution unit 70 does not exceed the allowable upper limit value by the scheduler unit 50 performing the processing in step S121 in a case of step S123: YES. After step S141, the processing returns to step S101.

The method of determining assignment of an analysis target image to the analysis software 60 by the scheduler unit 50 is not limited to the method illustrated in FIG. 6. In the processing in FIG. 6, the scheduler unit 50 determines assignment of an image to the analysis software 60 by, so to speak, a heuristic method. In contrast, the assignment of an image to the analysis software 60 may arrive at an optimization problem, and the scheduler unit 50 may obtain a stricter optimum solution.

For example, a variable or a constant is defined as follows upon formulation of an optimization problem.

N: an analysis target image group (a group of analysis target images acquired by the analysis target acquisition unit 10 in step S101).

P: an analysis software group (a group of the analysis software 60 executable by the analysis execution unit 70).

$A_{np}$: an estimation value of analysis precision that may be acquired when an analysis target image n (n∈N) is processed by analysis software p (p∈P).

$F_p$: a processing speed of the analysis software p.

$x_{np}$: a control variable for determining whether the analysis target image n is processed by the analysis software p. $x_{np}=1$ indicates that the analysis target image n is processed by the analysis software p. $x_{np}=0$ indicates that the analysis target image n is not processed by the analysis software p. The scheduler unit 50 sets $x_{np}=1$ for one piece (namely, one or zero) of the analysis software p at most among the pieces of the analysis software p included in the analysis software group for each analysis target image n (n∈N), and sets $x_{np}=0$ for the other analysis software p. The optimization problem for determining assignment of an analysis target image to the analysis software 60 by the scheduler unit 50 can be formulated as in Expression (2).

[Expression 2]

$$\left. \begin{array}{ll} \max. & \sum_{p \in P} \sum_{n \in N} A_{np} x_{np} \\ \text{subject to} & \sum_{p \in P} x_{np} \le 1, (n \in N) \\ & \sum_{n \in N} \sum_{p \in P} F_p x_{np} \le N/FPS_{th} \\ & x_{np} \in \{0, 1\}, (n \in N, p \in P) \end{array} \right\} \qquad (2)$$

A third expression "$x_{np} \in \{0, 1\}$, (n∈N, p∈P)" of a limiting condition indicates that $x_{np}=1$ is set when the analysis target image n is processed by the analysis software p described above and $x_{np}=0$ is set when the analysis target image n is not processed by the analysis software p. A first expression "$\sum_{p \in P} x_{np} \le 1$, (n∈N)" of the limiting condition indicates that $x_{np}=1$ is set for one piece of the analysis software p at most among the pieces of the analysis software p included in the analysis software group for each analysis target image n (n∈N) described above and $x_{np}=0$ is set for the other analysis software p.

A left side "$\sum_{n \in N} \sum_{p \in P} F_p x_{np}$" of a second expression "$\sum_{n \in N} \sum_{p \in P} F_p x_{np} \le N/FPS_{th}$" of the limiting condition indicates an estimation value of a processing time of the analysis execution unit 70. A right side "$N/FPS_{th}$" indicates an allowable upper limit value of the processing time of the analysis execution unit 70. The second expression of the limiting condition indicates a condition that the processing time of the analysis execution unit 70 is equal to or less than the allowable upper limit value.

An objective function "$\Sigma_{p \in P} \Sigma_{n \in N} A_{np} x_{np}$" indicates a total value of precision of an analysis performed by the analysis execution unit 70. The objective function corresponds to an example of an evaluation function with which an evaluation value of precision of an analysis performed by the analysis execution unit 70 is calculated. The scheduler unit 50 maximizes a value of the objective function by an optimization computation. In other words, the scheduler unit 50 performs scheduling in such a way as to maximize an evaluation of precision of an analysis performed by the analysis execution unit 70.

As described above, the analysis target acquisition unit 10 acquires analysis target data. The precision estimation unit 30 estimates analysis precision of the analysis target data in each of the plurality of pieces of the analysis software 60, based on analysis precision of comparison target data similar to the analysis target data beyond a reference among a plurality of pieces of comparison target data having known analysis precision in each of the plurality of pieces of the analysis software 60. The scheduler unit 50 selects the analysis software 60 to be used for an analysis of the analysis target data, based on an estimation result of analysis precision of the analysis target data in each of the plurality of pieces of the analysis software 60 and information indicating an analysis time of the analysis target data in each of the plurality of pieces of the analysis software 60. The analysis execution unit 70 performs an analysis of the analysis target data by using the analysis software 60 selected by the scheduler unit 50.

In this way, the precision estimation unit 30 estimates analysis precision of analysis target data in each of the plurality of pieces of the analysis software 60, based on analysis precision of comparison target data, and thus a setting operator of the data analysis device 1 does not need to preset a determination reference for adjusting a processing content. As described above, for example, the precision estimation unit 30 may automatically generate analysis precision data indicating analysis precision of comparison target data, and a setting operator of the data analysis device 1 does not need to previously generate the analysis precision data.

Further, the scheduler unit 50 determines whether to accept a combination of analysis target data and the analysis software 60 in order in which analysis precision is high and a processing time is short, and selects one analysis module at most for one piece of the analysis target data. In this way, the scheduler unit 50 can cause the analysis execution unit 70 to perform more analyses with high precision by preferentially selecting processing having high analysis precision and a short processing time. In this regard, it is expected that the scheduler unit 50 can perform scheduling that satisfies a limiting condition of time and increases analysis precision.

Further, the scheduler unit 50 selects the analysis software 60 estimated to have higher analysis precision within a range in which a predetermined condition related to a time required for an image analysis is satisfied. In this way, the scheduler unit 50 can cause the analysis execution unit 70 to perform an analysis that satisfies a limiting condition of time and has higher precision.

Further, when it is estimated that analysis precision equal to or more than a predetermined condition cannot be acquired by even any of the pieces of the analysis software 60 for analysis target data, the scheduler unit 50 determines that an analysis of the analysis target data is not performed. When analysis precision does not satisfy the predetermined condition, there is a possibility that an effective analysis result is not acquired and processing is useless. In contrast, the scheduler unit 50 determines that an analysis of analysis target data in which analysis precision equal to or more than the predetermined condition is not acquired is not performed, and thus execution of useless processing by the analysis execution unit 70 can be suppressed, and a resource can be effectively used.

Further, the analysis target acquisition unit 10 acquires image data as analysis target data. The precision estimation unit 30 estimates analysis precision of analysis target data in each of a plurality of analysis modules, based on analysis precision of comparison target data in which a color histogram of an image is similar to a color histogram of an image of the analysis target data beyond a predetermined condition among a plurality of pieces of comparison target data. In this way, the precision estimation unit 30 can evaluate a degree of similarity between an analysis target image and a comparison target image by relatively simple processing of calculating a color histogram of the analysis target image and comparing the calculated color histogram with a color histogram of the comparison target image.

Further, the analysis target acquisition unit 10 acquires image data as analysis target data. The precision estimation unit 30 estimates analysis precision of analysis target data in each of a plurality of analysis modules, based on analysis precision of comparison target data in which a mean squared error of a pixel value with a reference to a pixel value of the analysis target data is equal to or less than a predetermined condition among a plurality of pieces of comparison target data. In this way, the precision estimation unit 30 can evaluate a degree of similarity between an analysis target image and a comparison target image by relatively simple processing of calculating a mean squared error of a pixel value between the analysis target image and the comparison target image and performing a condition determination.

Second Example Embodiment

Figure 7:
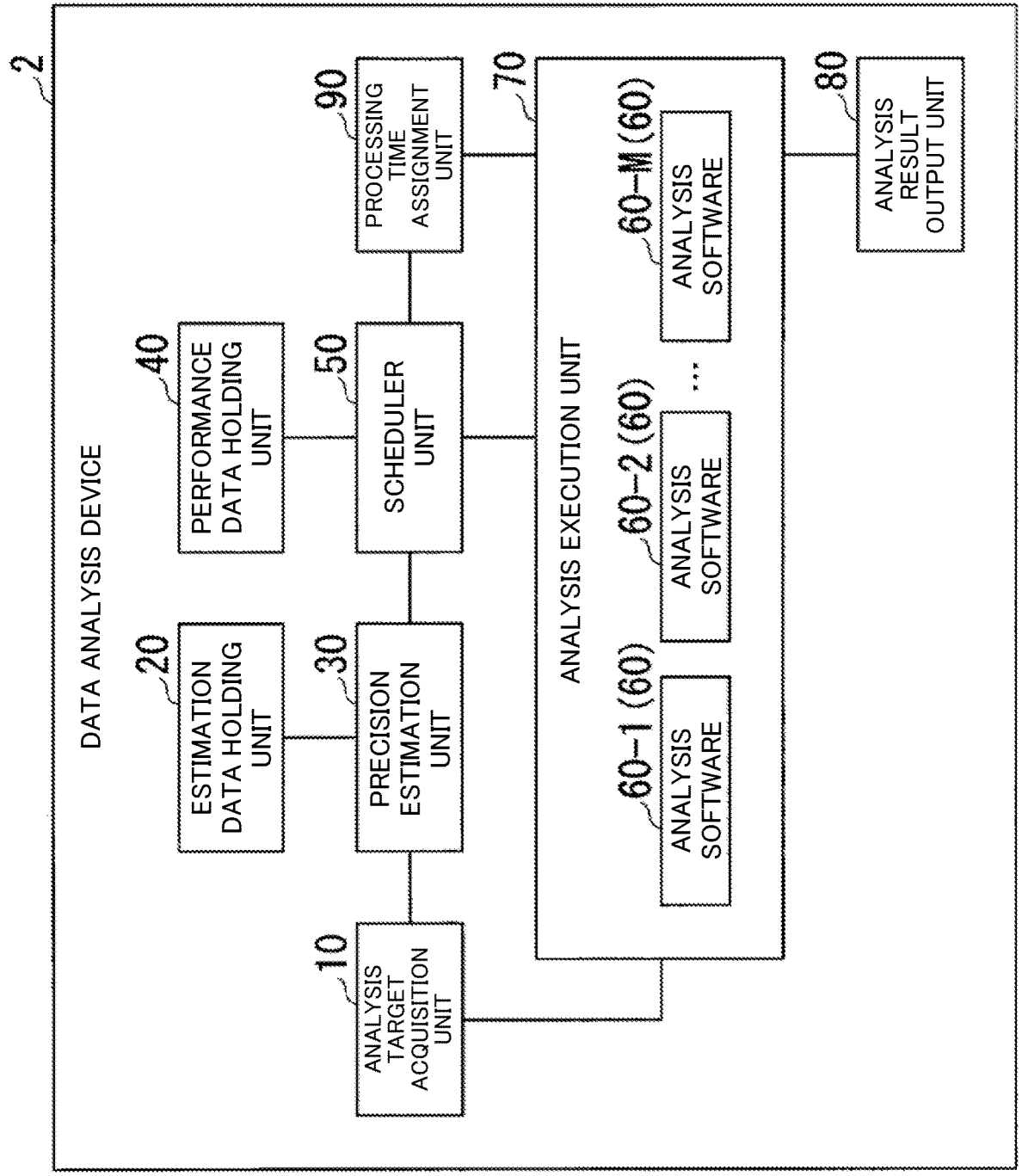
FIG. 7 is a schematic block diagram illustrating a functional configuration example of a data analysis device according to a second example embodiment.

FIG. 7 is a schematic block diagram illustrating a functional configuration example of a data analysis device according to a second example embodiment. In the configuration illustrated in FIG. 7, a data analysis device 2 further includes a processing time assignment unit 90 in addition to each of the units illustrated in FIG. 1. The data analysis device 2 (FIG. 7) is similar to the data analysis device 1 (FIG. 1) in the other point.

The processing time assignment unit 90 sets a time assigned to an analysis of analysis target data (an analysis of an analysis target image), based on a resource utilization rate in an analysis execution unit 70. A scheduler unit 50 selects analysis software 60 to be used for the analysis of the analysis target data according to the time set by the processing time assignment unit 90. Hereinafter, description is given by taking, as an example, a case where a load on the analysis execution unit 70 is used as a resource utilization rate in the analysis execution unit 70. The load on the analysis execution unit 70 may be calculated as a proportion of a time in which the analysis execution unit 70 actually uses a central processing unit (CPU) to a time of the CPU usable by the analysis execution unit 70, for example. However, a resource utilization rate used by the processing time assignment unit 90 is not limited to a load on the analysis execution unit 70, and may indicate a time for performing an analysis of an analysis target image by the analysis execution unit 70.

The processing time assignment unit 90 acquires information indicating a load on the analysis execution unit 70, calculates a processing speed that serves as a target from the information, and notifies the scheduler unit 50 of the processing speed. The scheduler unit 50 can calculate an allowable value of the processing time from a target value of the processing speed notified by the processing time assignment unit 90. For example, in the processing in FIG. 6, the processing time assignment unit 90 sets $FPS_{th}$, and the scheduler unit 50 calculates $N/FPS_{th}$. As described above, $FPS_{th}$ is an allowable value of a processing time per one image (per one frame), and corresponds to an example of the processing time. $N/FPS_{th}$ indicates an allowable value (upper limit value) of a time for analyzing an analysis target image by the analysis execution unit 70. For example, when the analysis execution unit 70 performs processing other than an analysis performed by using the analysis software 60, such as other analysis processing or learning processing, the scheduler unit 50 changes selection of the analysis software 60 in an adaptive manner according to a time designation from the processing time assignment unit 90. In this way, an improvement in the whole processing of the data analysis device 2 (for example, an improvement in analysis precision) can be achieved.

Figure 8:
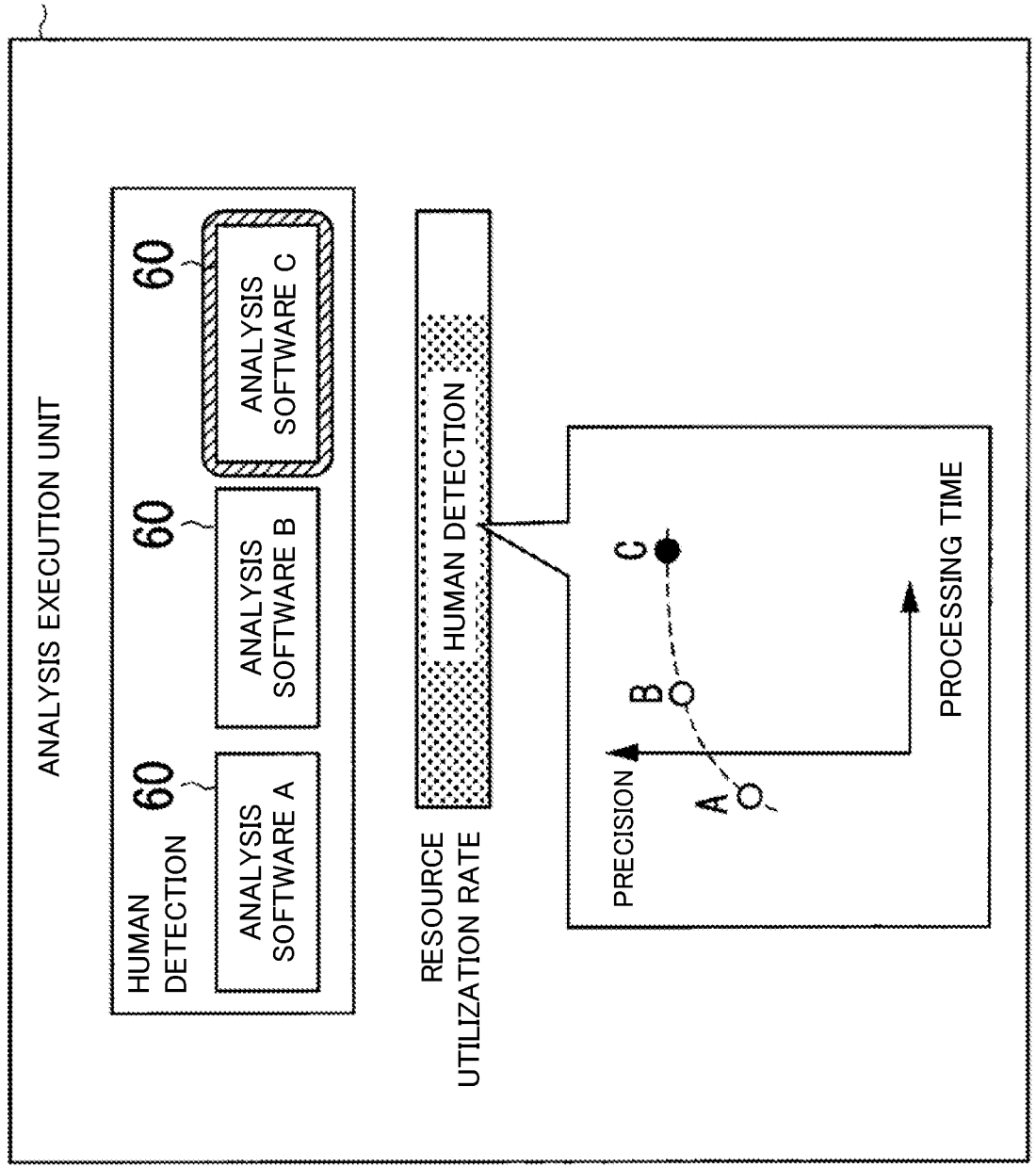
FIG. 8 is a diagram illustrating a first example of a resource use in an analysis execution unit according to the second example embodiment.

FIG. 8 is a diagram illustrating a first example of a resource use in the analysis execution unit 70. FIG. 8 illustrates an example of a case where software executed by the analysis execution unit 70 is only pieces of analysis software A to C that are pieces of analysis software for human detection (detection of an image of a person included in an analysis target image). In this case, the analysis execution unit 70 can use all usable resources for human detection. Then, the scheduler unit 50 performs scheduling in such a way that the analysis execution unit 70 performs an analysis of an analysis target image by using the analysis software 60 having relatively high precision. In a case of the example in FIG. 8, the analysis execution unit 70 analyzes an analysis target image by using the analysis software 60C having the best analysis precision according to the scheduling by the scheduler unit 50. In this way, the analysis execution unit 70 can make the utmost use of a resource.

Figure 9:
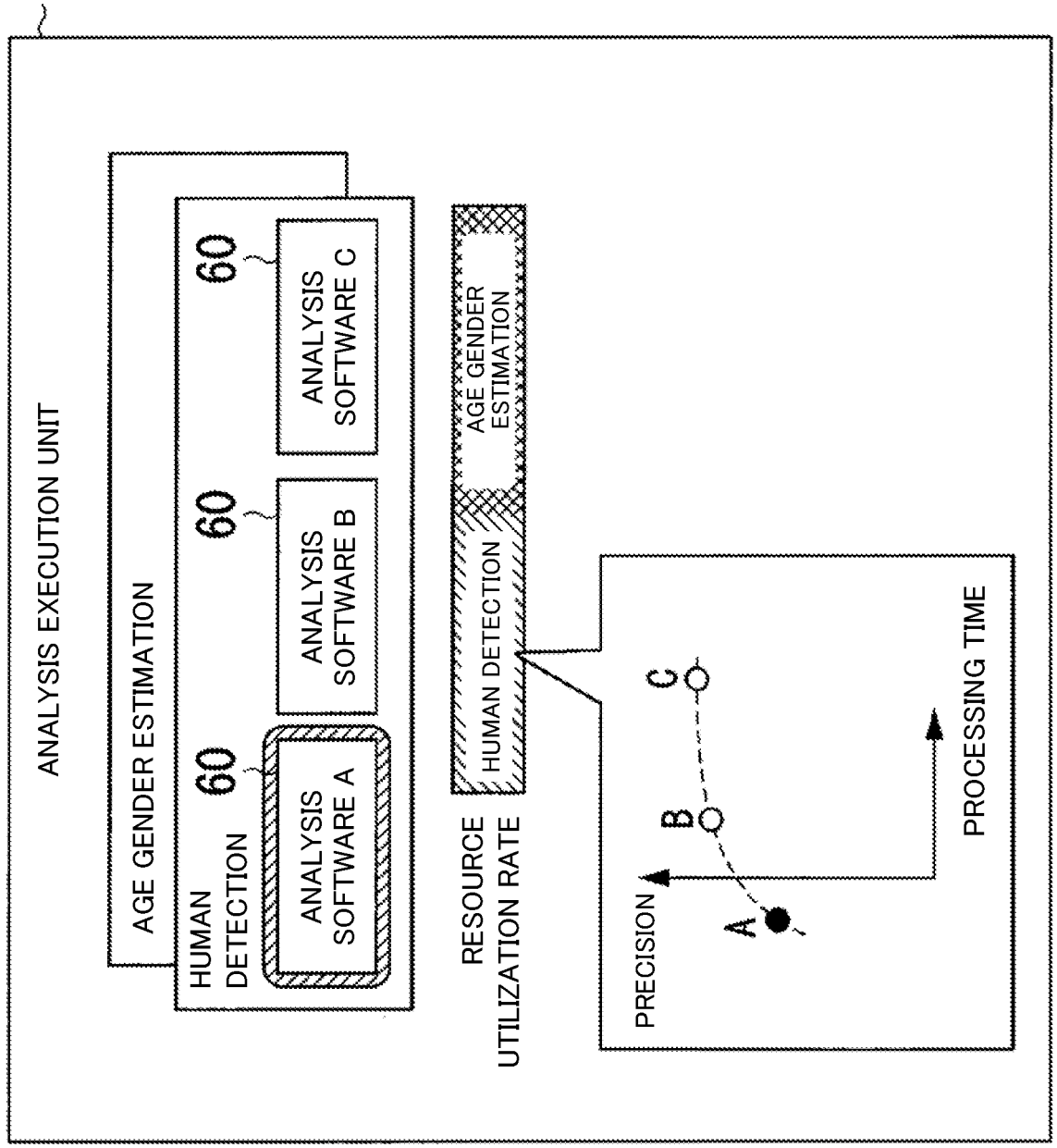
FIG. 9 is a diagram illustrating a second example of the resource use in the analysis execution unit according to the second example embodiment.

FIG. 9 is a diagram illustrating a second example of the resource use in the analysis execution unit 70. FIG. 9 illustrates an example of a case where analysis software for an age gender estimation (processing of estimating age and gender of a person detected from an analysis target image) is added as software executed by the analysis execution unit 70 to the analysis software for human detection. The analysis execution unit 70 performs age gender estimation processing by using analysis software different from the analysis software 60.

In the case of the example in FIG. 9, the analysis execution unit 70 performs both of human detection and an age gender estimation with a usable resource. Therefore, the resource that can be used for human detection by the analysis execution unit 70 is smaller than that in the case of the example in FIG. 8. Thus, the scheduler unit 50 performs scheduling in such a way that the analysis execution unit 70 performs an analysis of an analysis target image by using the analysis software 60 having analysis precision lower but a processing speed faster than those in the case of FIG. 8.

In the case of the example in FIG. 9, the analysis execution unit 70 analyzes an analysis target image by using the analysis software 60A having relatively low analysis precision but a fast processing speed according to the scheduling by the scheduler unit 50. In this way, the analysis execution unit 70 can distribute a resource to analysis software for human detection and analysis software for an age gender estimation, and execute the pieces of the analysis software together. In this regard, a resource utilization rate of the analysis execution unit 70 improves. In this way, the data analysis device 2 can select the analysis software 60 according to a load situation of the analysis execution unit 70, and adjust an execution speed of the analysis software 60.

Figure 10:
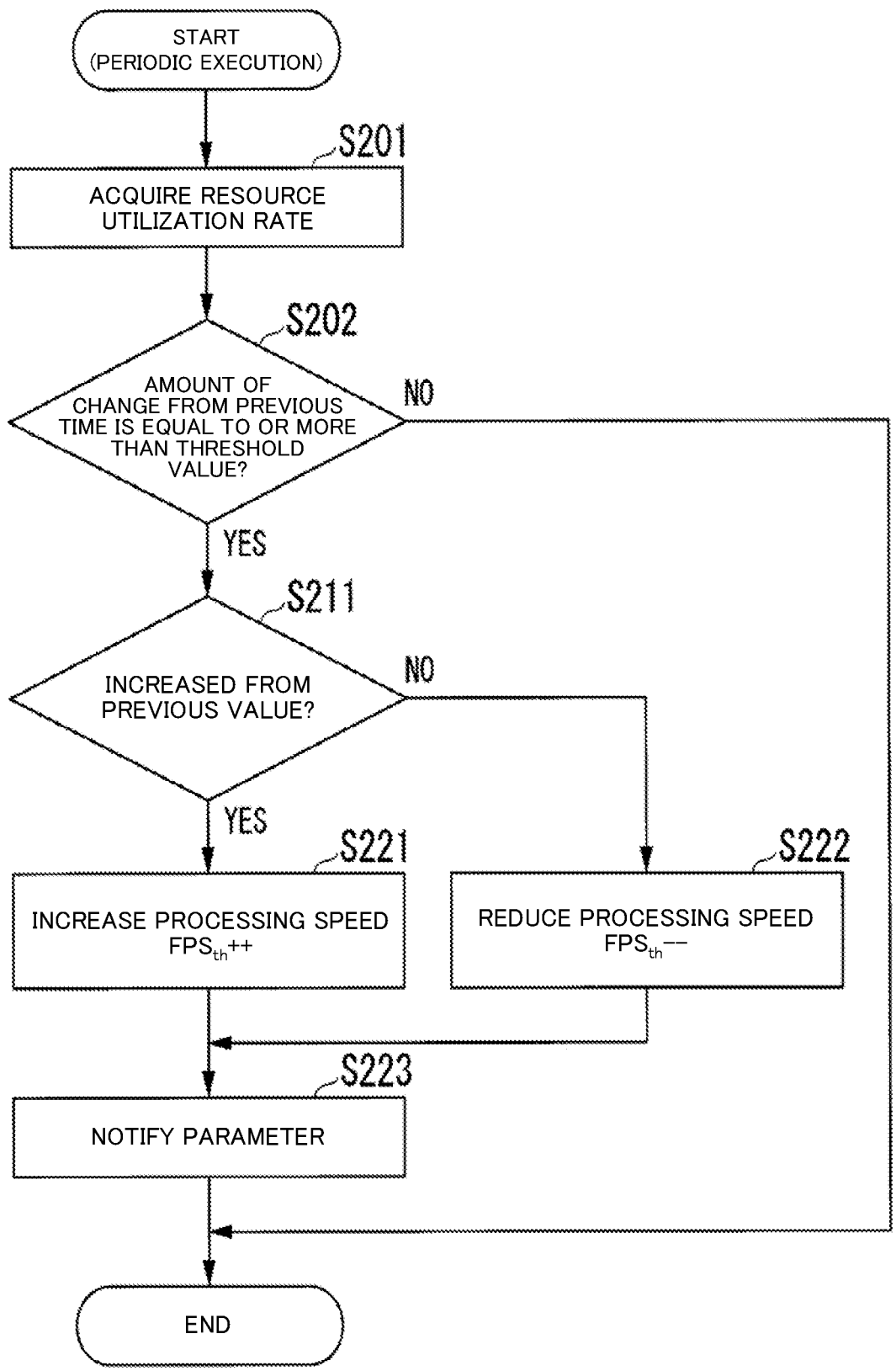
FIG. 10 is a diagram illustrating an example of a procedure of processing performed by a processing time assignment unit according to the second example embodiment.

Next, an operation of the processing time assignment unit 90 will be described with reference to FIG. 10. FIG. 10 is a diagram illustrating an example of a procedure of processing performed by the processing time assignment unit 90. When an amount of change in resource utilization rate of the analysis execution unit 70 from a previous resource utilization rate is increased by equal to or more than a threshold value, the processing time assignment unit 90 increases a processing speed. The processing time assignment unit 90 increases the processing speed, and thus the scheduler unit 50 performs scheduling in such a way that the analysis execution unit 70 uses the analysis software 60 having a relatively light weight (having relatively low analysis precision but a relatively high processing speed). As a result, a resource utilization rate of the analysis execution unit 70 decreases in relation to the processing using the analysis software 60.

On the other hand, when an amount of change from a previous resource utilization rate is reduced by equal to or more than the threshold value, it represents that a space is generated in a resource. Thus, the processing time assignment unit 90 reduces a processing speed. The processing time assignment unit 90 increases the processing speed, and thus the scheduler unit 50 performs scheduling in such a way that the analysis execution unit 70 uses the analysis software 60 having relatively high analysis precision, and precision of an analysis by the analysis execution unit 70 can be increased.

In the processing in FIG. 10, the processing time assignment unit 90 acquires information indicating a resource utilization rate of the analysis execution unit 70 (step S201). Then, the processing time assignment unit 90 determines whether an amount of change (absolute value) in resource utilization rate from a previous time is equal to or more than a threshold value (step S202). When the processing time assignment unit 90 determines that the amount of change is smaller than the threshold value (step S202: NO), the processing time assignment unit 90 terminates the processing in FIG. 10.

On the other hand, when the processing time assignment unit 90 determines that the amount of change is equal to or more the threshold value in step S202 (step S202: YES), the processing time assignment unit 90 determines whether the resource utilization rate is increased in comparison with the previous time (step S211). When the processing time assignment unit 90 determines that the resource utilization rate is increased (step S211: YES), the processing time assignment unit 90 increases a value of $FPS_{th}$ (step S221).

In this way, a value of the threshold value $N/FPS_{th}$ used in step S123 in FIG. 6 by the scheduler unit 50 is reduced. In other words, a processing time assigned to the analysis software 60 is reduced. Therefore, the processing time assignment unit 90 can increase an amount of a resource assigned to another program by the analysis execution unit 70. For example, in the example described with reference to FIGS. 8 and 9, the analysis execution unit 70 can reduce an amount of a resource assigned to the analysis program for the human detection, and increase an amount of the resource assigned to the analysis program for the age gender estimation.

Then, the processing time assignment unit 90 notifies the scheduler unit 50 of a set parameter value (value of $FPS_{th}$) (step S223). After step S223, the processing time assignment unit 90 terminates the processing in FIG. 10.

On the other hand, when the processing time assignment unit 90 determines that the resource utilization rate is reduced in step S211 (step S211: NO), the processing time assignment unit 90 reduces the value of $FPS_{th}$ (step S222). In this way, a value of the threshold value $N/FPS_{th}$ used in step S123 in FIG. 6 by the scheduler unit 50 is increased. In other words, a processing time assigned to the analysis software 60 is increased. Therefore, the analysis execution unit 70 can increase an amount of a resource assigned to the analysis software 60 being a scheduling target, and can use the analysis software 60 having higher analysis precision.

For example, in the example described with reference to FIGS. 8 and 9, when use of the analysis software for the age gender estimation is terminated, a usable resource is increased. In this case, the analysis execution unit 70 can increase an amount of the resource assigned to the analysis software 60 for the human detection. After step S222, the processing proceeds to step S223.

As described above, the processing time assignment unit 90 sets a time assigned to an analysis of analysis target data, based on a resource utilization rate in the analysis execution unit 70. The scheduler unit 50 selects the analysis software 60 to be used for the analysis of the analysis target data according to the time set by the processing time assignment unit 90. In this way, the data analysis device 2 can achieve an improvement in the whole processing according to an increase and a reduction in processing to be executed.

Next, a configuration of the example embodiment of the present invention will be described below with reference to FIGS. 11 and 12.

Figure 11:
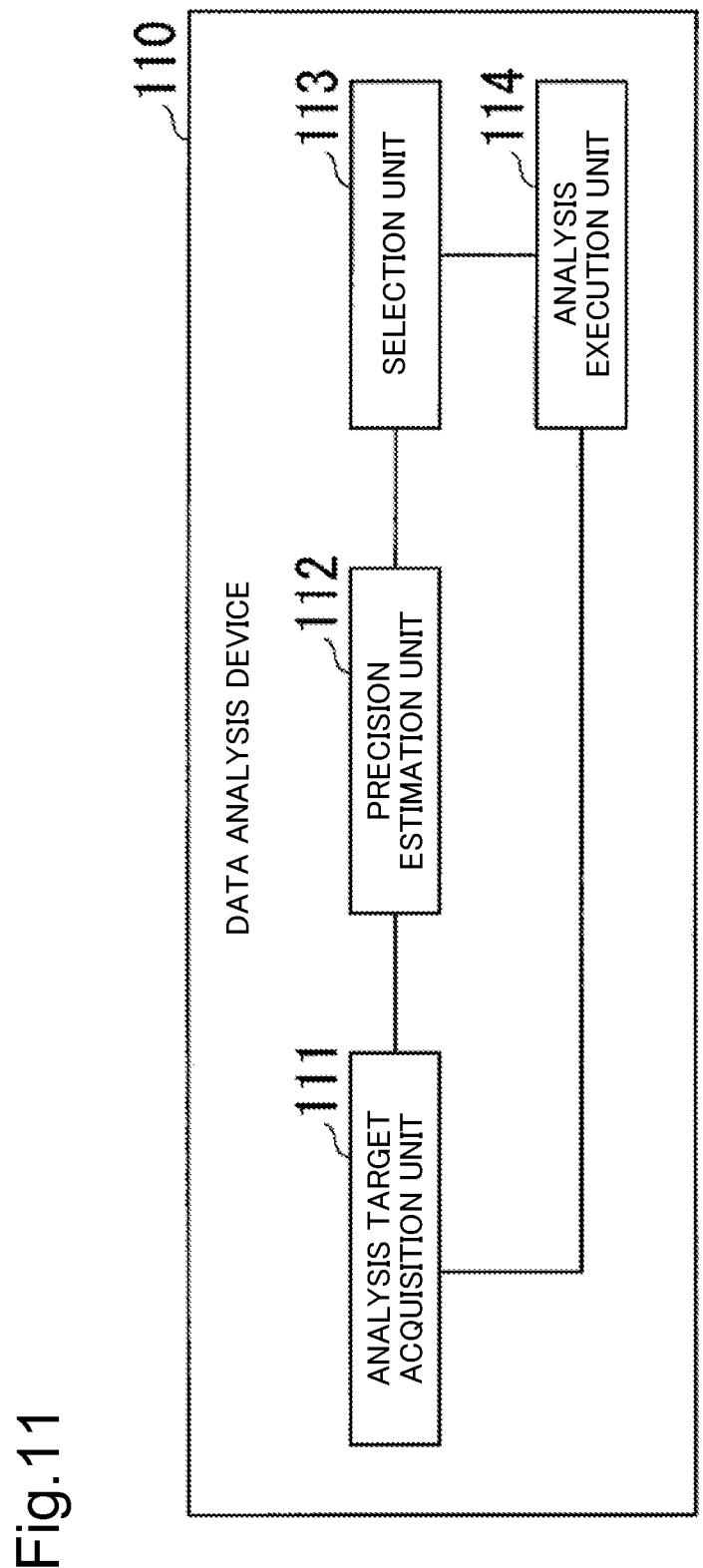
FIG. 11 is a diagram illustrating an example of a configuration of a data analysis device according to the example embodiment.

FIG. 11 is a diagram illustrating an example of a configuration of a data analysis device according to the example embodiment. A data analysis device 110 illustrated in FIG. 11 includes an analysis target acquisition unit 111, a precision estimation unit 112, a selection unit 113, and an analysis execution unit 114. In the configuration, the analysis target acquisition unit 111 acquires analysis target data. The precision estimation unit 112 estimates analysis precision of the analysis target data in each of a plurality of analysis modules, based on analysis precision of comparison target data similar to the analysis target data beyond a reference among a plurality of pieces of comparison target data having known analysis precision in each of the plurality of analysis modules. The selection unit 113 selects an analysis module to be used for an analysis of the analysis target data, based on an estimation result of analysis precision of the analysis target data in each of the plurality of analysis modules and information indicating an analysis time of the analysis target data in each of the plurality of analysis modules. The analysis execution unit 114 performs an analysis of the analysis target data by using the analysis module selected by the selection unit 113. In this way, the precision estimation unit 112 estimates analysis precision of analysis target data in each of the plurality of analysis modules, based on analysis precision of comparison target data, and thus a setting operator of the data analysis device 110 does not need to preset a determination reference for adjusting a processing content.

Figure 12:
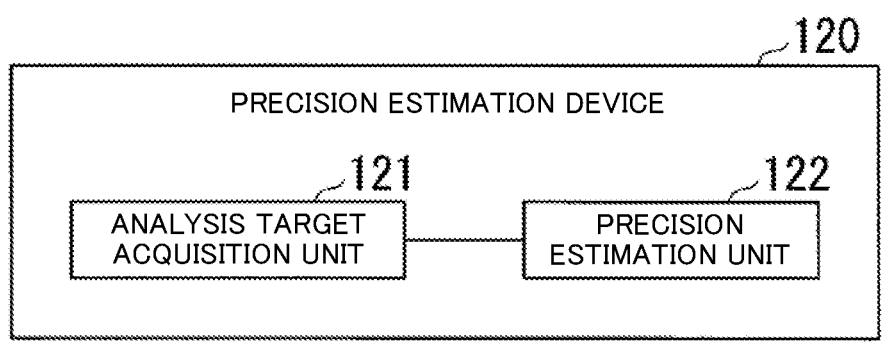
FIG. 12 is a diagram illustrating an example of a configuration of a data precision estimation device according to the example embodiment.

FIG. 12 is a diagram illustrating an example of a configuration of a data precision estimation device according to the example embodiment. A precision estimation device 120 illustrated in FIG. 12 includes an analysis target acquisition unit 121 and a precision estimation unit 122. In the configuration, the analysis target acquisition unit 121 acquires analysis target data. The precision estimation unit 122 estimates analysis precision of the analysis target data in each of a plurality of analysis modules, based on analysis precision of comparison target data similar to the analysis target data beyond a reference among a plurality of pieces of comparison target data having known analysis precision in each of the plurality of analysis modules. In this way, the precision estimation unit 122 estimates analysis precision of analysis target data in each of the plurality of analysis modules, based on analysis precision of comparison target data, and thus a setting operator of the precision estimation device 120 does not need to preset a determination reference for adjusting a processing content.

Figure 13:
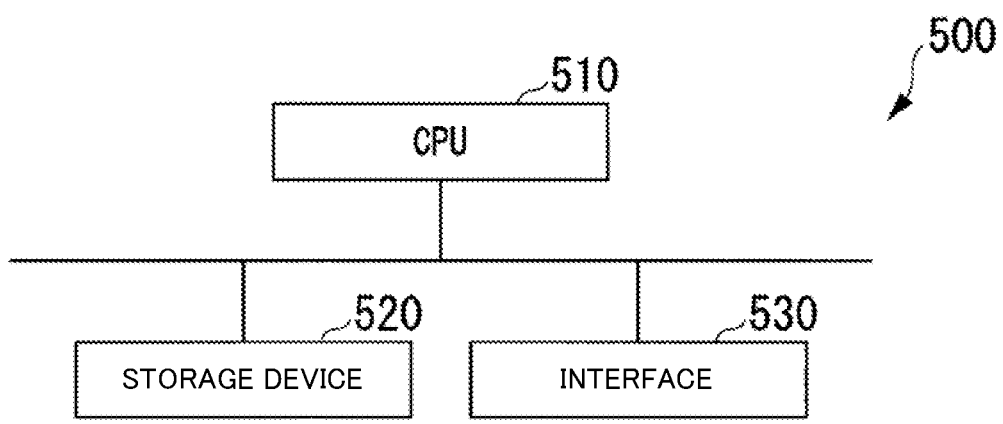
FIG. 13 is a schematic block diagram illustrating a configuration example of a computer according to at least one example embodiment.

FIG. 13 is a schematic block diagram illustrating a configuration example of a computer according to at least one example embodiment. In the configuration illustrated in FIG. 13, a computer 500 includes a CPU 510, a storage device 520, and an interface 530. When the data analysis device 1 described above is mounted on the computer, the operation of each of the processing units (the precision estimation unit 30, the scheduler unit 50, the analysis software 60, and the analysis execution unit 70) described above is stored in the storage device 520 in a form of a program. The CPU 510 performs the processing of each of the processing units by reading a program from the storage device 520 and executing the program. Further, the CPU 510 secures, in the storage device 520, a storage region corresponding to each of the storage units (the estimation data holding unit 20 and the performance data holding unit 40) described above, according to the program. The function of the analysis target acquisition unit 10 and the analysis result output unit 80 is performed by controlling the interface 530 by the CPU 50 according to the program. When the data analysis device 2 described above is mounted on the computer, the processing time assignment unit 90 further corresponds to the processing unit in addition to the case of the data analysis device 1.

When the data analysis device 110 described above is mounted on the computer, the precision estimation unit 112, the selection unit 113, and the analysis execution unit 114 correspond to the processing units. The operation of the processing units is stored in the storage device 520 in a form of a program. The CPU 510 performs the processing of each of the processing units by reading a program from the storage device 520 and executing the program. Further, the CPU 510 secures, in the storage device 520, a storage region corresponding to a storage unit used by each of the processing units according to the program. The function of the analysis target acquisition unit 111 is performed by controlling the interface 530 by the CPU 50 according to the program.

When the precision estimation device 120 described above is mounted on the computer, the precision estimation unit 122 corresponds to the processing unit. The operation of the processing unit is stored in the storage device 520 in a form of a program. The CPU 510 performs the processing of each of the processing units by reading a program from the storage device 520 and executing the program. Further, the CPU 510 secures, in the storage device 520, a storage region corresponding to a storage unit used by the processing unit according to the program. The function of the analysis target acquisition unit 121 is performed by controlling the interface 530 by the CPU 50 according to the program.

Note that a program for achieving the whole or a part of the function of the data analysis devices 1, 2, and 110 and the precision estimation device 120 may be recorded in a computer-readable recording medium, and processing of each of the units may be performed by causing a computer system to read the program recorded in the recording medium and execute the program. Note that it is assumed that the "computer system" herein includes hardware such as an OS and peripheral equipment. Further, the "computer-readable recording medium" refers to a storage device such as a portable medium, such as a flexible disk, a magneto-optical disk, a read only memory (ROM), and a compact disc read only memory (CD-ROM), and a hard disk built in the computer system. Further, the program mentioned above may achieve a part of the above-described function, and may be further achievable by a combination of the above-described function and a program that is already recorded in the computer system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-085787, filed on Apr. 26, 2018, the disclosure of which is incorporated herein in its entirety by reference.

REFERENCE SIGNS LIST

1, 2, 110 Data analysis device
10, 111, 121 Analysis target acquisition unit
20 Estimation data holding unit
30, 112, 122 Precision estimation unit
40 Performance data holding unit
50 Scheduler unit
60 Analysis software
70, 114 Analysis execution unit
80 Analysis result output unit
90 Processing time assignment unit
113 Selection unit
120 Precision estimation device

What is claimed is:

1. A data analysis device, comprising:
an analysis target acquisition unit acquiring analysis target data;
a precision estimation unit estimating analysis precision of the analysis target data in each of a plurality of analysis modules, based on analysis precision of comparison target data similar to the analysis target data beyond a reference among a plurality of pieces of comparison target data having known analysis precision in each of the plurality of analysis modules;
a selection unit selecting an analysis module to be used for an analysis of the analysis target data from among the plurality of analysis modules, based on an estimation result of analysis precision of the analysis target data in each of the plurality of analysis modules and information indicating an analysis time of the analysis target data in each of the plurality of analysis modules; and
an analysis execution unit performing an analysis of the analysis target data by using an analysis module selected by the selection unit.

2. The data analysis device according to claim 1, wherein the selection unit determines whether to accept a combination of the analysis target data and the analysis module in order in which analysis precision is high and a processing time is short, and selects one analysis module at most for one piece of analysis target data.

3. The data analysis device according to claim 1, wherein the selection unit selects an analysis module estimated to have higher analysis precision within a range in which a predetermined condition related to a time required for an image analysis is satisfied.

4. The data analysis device according to claim 1, wherein, when it is estimated that analysis precision equal to or more than a predetermined condition cannot be acquired by even any of analysis modules for the analysis target data, the selection unit determines that an analysis of the analysis target data is not performed.

5. The data analysis device according to claim 1, further comprising
a processing time assignment unit setting a time to be assigned to an analysis of the analysis target data, based on a resource utilization rate in the analysis execution unit, wherein
the selection unit selects an analysis module to be used for an analysis of the analysis target data according to a time being set by the processing time assignment unit.

6. The data analysis device according to claim 1, wherein the analysis target acquisition unit acquires image data as the analysis target data, and
the precision estimation unit estimates analysis precision of the analysis target data in each of the plurality of analysis modules, based on analysis precision of comparison target data in which a color histogram of an image is similar to a color histogram of an image of the analysis target data beyond a predetermined condition among the plurality of pieces of comparison target data.

7. The data analysis device according to claim 1, wherein the analysis target acquisition unit acquires image data as the analysis target data, and
the precision estimation unit estimates analysis precision of the analysis target data in each of the plurality of analysis modules, based on analysis precision of comparison target data in which a mean squared error of a pixel value with a reference to a pixel value of the analysis target data is equal to or less than a predetermined condition among the plurality of pieces of comparison target data.

8. A data analysis method, comprising:
acquiring analysis target data;
estimating analysis precision of the analysis target data in each of a plurality of analysis modules, based on analysis precision of comparison target data similar to the analysis target data beyond a reference among a plurality of pieces of comparison target data having known analysis precision in each of the plurality of analysis modules;
selecting an analysis module to be used for an analysis of the analysis target data from among the plurality of analysis modules, based on an estimation result of analysis precision of the analysis target data in each of the plurality of analysis modules and information indicating an analysis time of the analysis target data in each of the plurality of analysis modules; and
performing an analysis of the analysis target data by using a selected analysis module.

9. A non-transitory computer-readable storage medium A storage medium that stores a program for causing a computer to execute:

processing of acquiring analysis target data;

processing of estimating analysis precision of the analysis target data in each of a plurality of analysis modules, based on analysis precision of comparison target data similar to the analysis target data beyond a reference among a plurality of pieces of comparison target data having known analysis precision in each of the plurality of analysis modules;

processing of selecting an analysis module to be used for an analysis of the analysis target data from among the plurality of analysis modules, based on an estimation result of analysis precision of the analysis target data in each of the plurality of analysis modules and information indicating an analysis time of the analysis target data in each of the plurality of analysis modules; and processing of performing an analysis of the analysis target data by using a selected analysis module.

* * * * *